Sept. 25, 1951  W. A. WILSON  2,568,939
SAFETY HOOK

Filed April 19, 1949  2 Sheets-Sheet 1

INVENTOR.
WILLIAM A. WILSON
BY
ATTORNEY

Sept. 25, 1951 W. A. WILSON 2,568,939
SAFETY HOOK
Filed April 19, 1949 2 Sheets-Sheet 2
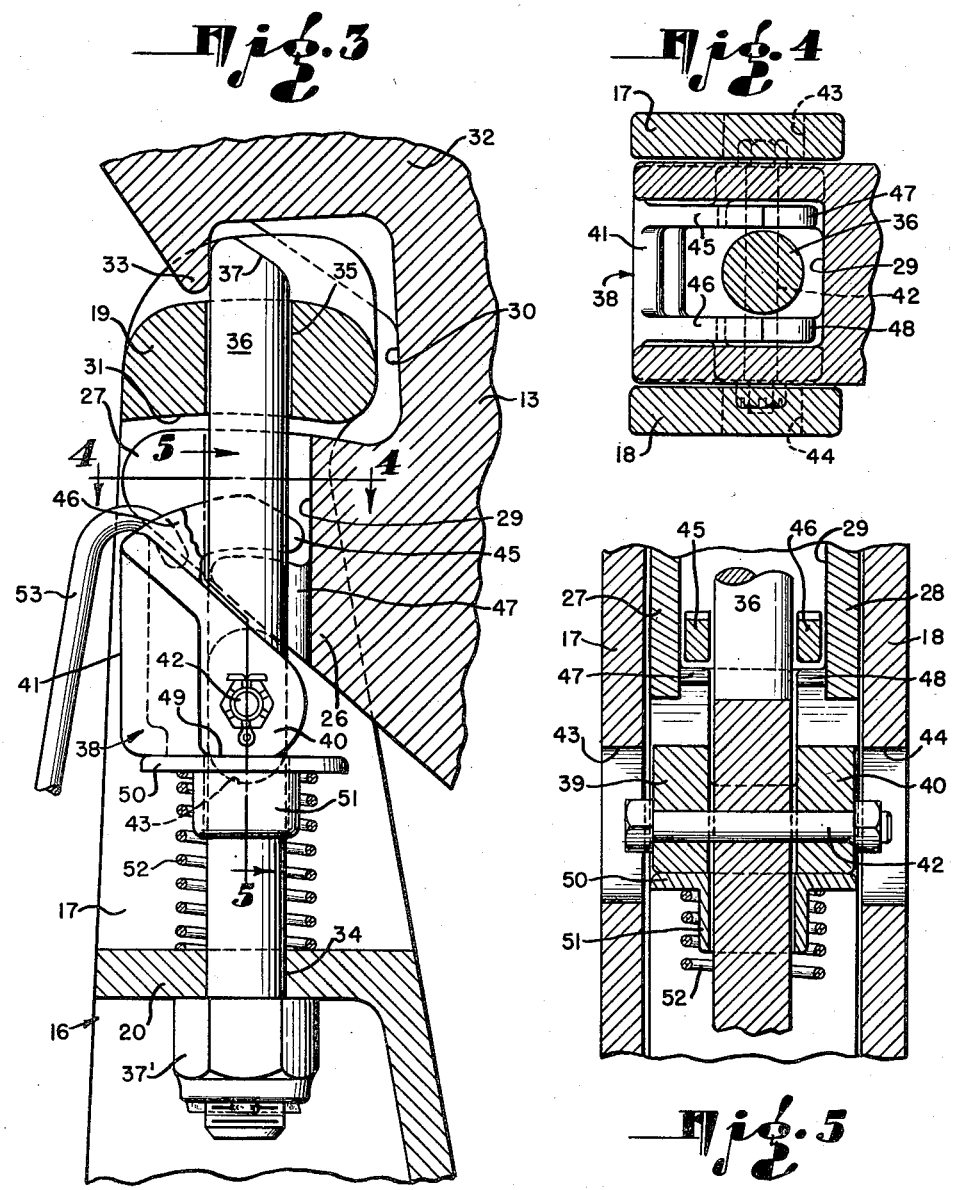
INVENTOR.
WILLIAM A. WILSON
BY
ATTORNEY Patented Sept. 25, 1951

2,568,939

UNITED STATES PATENT OFFICE 2,568,939

SAFETY HOOK

William A. Wilson, Los Angeles, Calif.

Application April 19, 1949, Serial No. 88,279

10 Claims. (Cl. 24—241)

1

The present invention relates generally to hooks of the type utilized in the oil industry for raising and lowering drill pipes or casing; and is more particularly concerned with improvements in locking means for the latch link arms of such hooks.

It is one object of the present invention to provide in hooks of the herein described type, improved latch locking means of a simple, strong and effective construction; wherein both the latching and latch locking members are arranged, in the closed position of the notch closing link arm of the hook, to latchingly engage the hook body.

A further object of the invention is to provide improved latching-locking means for the notch closing link arm of a hook, which is of two-part construction, and wherein a single spring is utilized to bias said parts toward their effective positions.

Further objects of the invention will be brought out in the following part of the specification, wherein detailed description is for the purpose of fully disclosing the invention without placing limitations on the scope of the invention defined in the appended claims.

Referring to the drawings, which are for illustrative purposes only:

Fig. 3 is an enlarged fragmentary vertical section through the latch means, taken substantially on line 3—3 of Fig. 2;

Fig. 4 is a transverse section through the same, taken substantially on line 4—4 of Fig. 3; and Fig. 5 is a substantially vertical section through certain of the latching parts, taken substantially on line 5—5 of Fig. 3.

Figure 1:
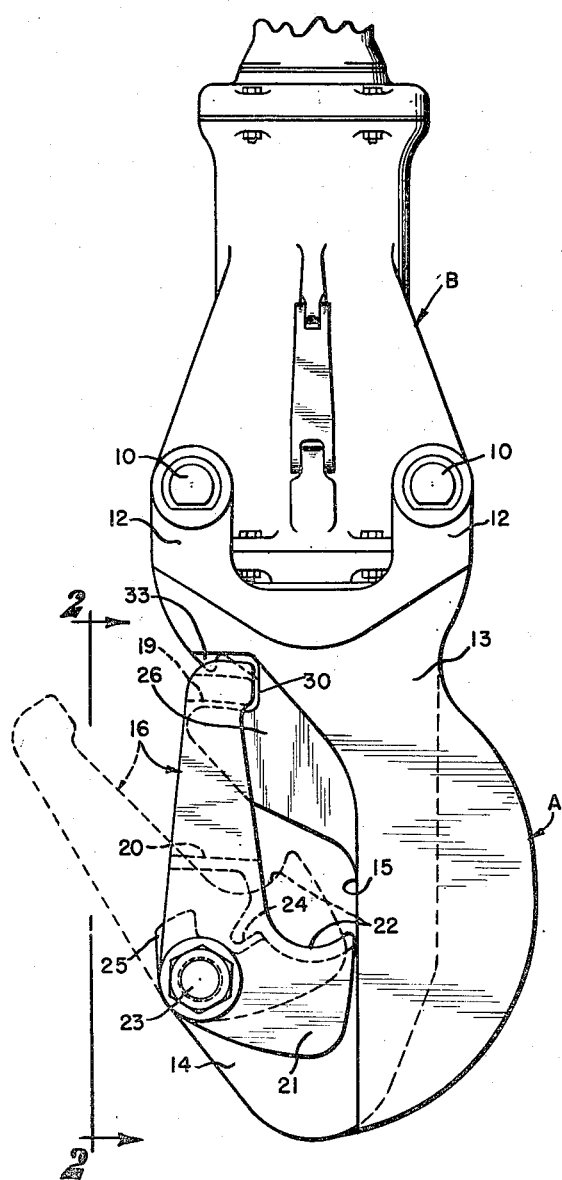
Fig. 1 is a side elevational view of a hook assembly embodying the features of the present invention.

For purposes of illustration, there is shown in Fig. 1 a hook assembly having a hook as generally indicated at A and embodying the features of the present invention, which is suspended from a connector as generally indicated at B, by means of attaching cross-pins 10 which extend through spaced sets of attaching lugs 12 formed integrally with the hook body 13.

The hook body in general comprises a forwardly projecting bill 14 at its lowermost end which cooperates with the upper portions of the hook body to define a receiving notch 15 adapted

2 to receive a hoisting sling, link or other member therein.

Pivotally supported at the outer end of the bill 14 for swinging movements to open and closed positions with respect to the entrance to the notch 15, is a link arm 16. The open position of the link arm is shown in dotted lines in Fig. 1, while the closed position is shown in full lines therein.

Figure 2:
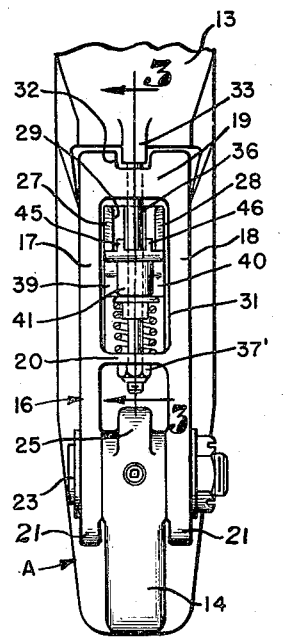
Fig. 2 is a fragmentary front elevational view, showing details of the latching means, certain parts being shown in section, as viewed from line 2—2 of Fig. 1.

As shown in Figs. 1 and 2, the link arm is integrally formed with spaced sides 17 and 18 which are joined at their outermost ends by a bridging head 19, and adjacent its pivoted end by a web 20 which is carried along the rear edges of the sides 17 and 18 and the upper edges of rearwardly extending wing portions 21—21 to form a concave surface 22 adapted to be engaged by a bail or link inserted in the notch 15 to automatically close the link arm 16.

The arm is pivoted by means of a pivot bolt 23. For limiting the swinging movement of the link arm 16 at the open position, there is provided an inwardly projecting abutment or lug 24 on the web 20 which is adapted to engage a stop lug 25 projecting from the end of the bill 14 above the link arm pivot.

Above the notch 15, the hook body 13 is formed with a generally U-shaped projection 26 with its end portion fabricated to define spaced side walls 27 and 28 of a vertically extending channel 29.

The projection 26 cooperates with the adjacent portion of the hook body thereabove to form a notch 30 adapted to receive therein the head 19, when the link arm 16 is in closed position. It will be observed that in the closed position of the arm 16, the walls 27 and 28 project into an opening 31 extending between the arm sides 17 and 18, the walls 27 and 28 lying close to the inner surfaces of sides 17 and 18 respectively.

The central portion of the head 19 is provided with a central groove 32 within which a downwardly projecting lug 33 formed in the hook body at the upper end of notch 30 is adapted to move during closing of the link arm 16.

As shown in Fig. 3, the web 20 and head 19 are provided with axially aligned passages 34 and 35 within which the end portions of a latch bolt 36 are positioned to support the bolt for reciprocable endwise movements to position its uppermost projecting end in latched and unlatched relation with respect to lug 33. The upper end of the latch bolt 36 is provided with a cam surface 37 adapted to ride over the lug 33 during closing of the link arm. Upward movement of the latch bolt is limited by abutment against web 20 of a nut 37' threaded onto the lowermost end of the latch bolt.

A latch locking member 38 of generally U-shape construction is provided with spaced side legs 39 and 40 connected by a wall portion 41, the legs 39 and 40 being pivotally connected by a pivot bolt 42 to the latch bolt for swinging movement thereon. The projecting ends of the pivot bolt 42 extend into elongate openings 43 and 44 of sides 17 and 18 respectively of the link arm, as best shown in Fig. 5.

Associated with the upper margins of the legs 39 and 40 of the locking member 38 are integrally formed spaced hooks 45 and 46 respectively arranged to straddle the latch bolt 36, and in the closed position of the link arm extend over shoulders 47 and 48 projecting inwardly from the walls 27 and 28 respectively.

The legs 39 and 40 of the locking member are provided with flat edge portions 49 which form cam surfaces adapted to bear against an end flange 50 of a retaining collar 51 for one end of a coiled spring 52, the collar being slidable axially of the latch bolt. The opposite end of the spring 52 abuts the adjacent surface of web 20.

From the foregoing description, it will be seen that the spring 52 acting against the edge portions 49 on each side of the latch bolt 36 forces the locking member to normally occupy a locking position, and that when the locking member is rotated about its pivot to an unlocked position, the spring 52 will upon release of the locking member return it to locking position. This same spring, it will be noted, also acts to bias the latch bolt to latching position.

With the link arm in closed position, in which position it is normally latched by the latch bolt 36 and locked against unlatching by locking member 38, the procedure in opening the link arm is as follows:

An opening device, such as a shepard hook 53, as shown in Fig. 3, is hooked over the upper edge of the wall 41 of the locking member between the hooks 45 and 46. By exerting a downward pressure or pull on the shepard hook, the locking member 38 is pivotally swung so that the hooks 45 and 46 will be disengaged with respect to the shoulders 47 and 48. This initial movement of the locking member 38 unlocks the latch bolt 36, and upon continuing the pull on the shepard hook the latch bolt will be retracted against the pressure of spring 52. As soon as the latch bolt is withdrawn sufficiently to clear the lug 33, continued pull on the shepard hook will then operate to swing the link arm to open position.

It will be observed that in the closed latched position of the link arm, the hooks 45 and 46 overlie the shoulders 47 and 48 so as to lock the latch bolt 36 against retraction.

I claim as my invention:

1. A safety hook, comprising: a body with a forwardly extending bill forming a receiving notch; an arm pivoted to said bill adapted to close the entrance to said notch, said arm having a head portion; a latch bolt carried by said arm adapted in the closed position of said arm to latchingly engage the hook body on one side of said head; a latch locking member carried by said arm adapted in the closed position of said arm to latchingly engage the hook body on the opposite side of said head; and spring means biasing said bolt and locking member to latching positions.

2. A safety hook, comprising: a body with a forwardly extending bill forming a receiving notch; an arm pivoted to said bill adapted to close the entrance to said notch, said arm having a head portion; a latch bolt supported in the head portion for movement to latched and unlatched positions, and adapted in the closed position of said arm to latchingly engage the hook body outwardly of said head portion; a latch locking member carried by said bolt adapted in the closed position of said arm to latchingly engage the hook body inwardly of said head portion; and spring means biasing said bolt and locking member to latching positions.

3. A safety hook, comprising: a body with a forwardly extending bill forming a receiving notch; an arm pivoted to said bill adapted to close the entrance to said notch, said arm having a head portion; a latch bolt supported in the head portion for movement to latched and unlatched positions, and adapted in the closed position of said arm to latchingly engage the hook body outwardly of said head portion; a latch locking member carried by said bolt adapted in the closed position of said arm to latchingly engage the hook body inwardly of said head portion on opposite sides of the bolt; and spring means biasing said bolt and locking member to latching positions.

4. In a safety hook having a body with a forwardly extending bill forming a receiving notch, and an arm pivoted to said bill adapted to close the entrance to said notch: a latch bolt carried by said arm supported for movements to latched and unlatched positions, and adapted in the closed position of said arm to latchingly engage the hook body; a lever pivoted on said latch bolt having a bifurcated end defining hooks adapted in the latched position of the latch bolt to latchingly engage the hook body on opposite sides of the latch bolt; and a coiled spring acting to bias said latch bolt and said lever towards latching positions.

5. In a safety hook having a body with a forwardly extending bill forming a receiving notch, and an arm pivoted to said bill adapted to close the entrance to said notch: a latch bolt carried by said arm supported for movements to latched and unlatched positions, and adapted in the closed position of said arm to latchingly engage the hook body; a lever pivoted on said latch bolt having a portion adapted in latched position of the latch bolt to latchingly engage the hook body; and a coiled spring acting to bias said latch bolt and said lever towards latching positions.

6. In a safety hook having a body with a forwardly extending bill forming a receiving notch, and an arm pivoted to said bill adapted to close the entrance to said notch: a latch bolt carried by said arm adapted to latchingly engage the hook body upon movement of said arm to closed position; a locking member carried by said bolt adapted in the closed position of the arm to lock the bolt against movement from its latching position; and a single spring normally biasing said bolt and member towards their respective latching and locking positions.

7. In a safety hook having a body with a forwardly extending bill forming a receiving notch, and an arm pivoted to said bill adapted to close the entrance to said notch: a latch bolt carried by said arm adapted to latchingly engage the hook body upon movement of said arm to closed position; a locking member for interconnecting the hook body and latch bolt in the closed position of said arm, and opposing movement of the latch bolt from latching position; and means normally biasing the latch bolt towards latching position and said locking member towards locking position.

8. In a safety hook having a body with a forwardly extending bill forming a receiving notch, and an arm pivoted to said bill adapted to close the entrance to said notch: a bolt carried by said arm adapted in the closed position of the arm to latchingly interconnect the arm and hook body; a member supported for movement with said arm adapted to lockingly interconnect the bolt and hook body in said closed position of the arm; and common manually operable means for initially releasing said member and subsequently releasing said bolt.

9. In a safety hook having a body with a forwardly extending bill forming a receiving notch, and an arm pivoted to said bill adapted to close the entrance to said notch: a bolt carried by said arm adapted in closed position of the arm to latchingly interconnect the arm and hook body; a member supported for movement with said arm adapted to lockingly interconnect the bolt and hook body in said closed position of the arm; and manual means for sequentially moving the member and bolt to release positions.

10. In a safety hook having a body with a forwardly extending bill forming a receiving notch, and an arm pivoted to said bill adapted to close the entrance to said notch: a two-part latching means carried by said arm for releasably retaining it in closed position, one of said parts being latchingly engageable with the hook body to oppose opening movement of the arm, and the other of said parts being engageable with the hook body to oppose movement of said one of said parts from engagement with the hook body; and means normally biasing said parts towards positions for engagement with said body.

WILLIAM A. WILSON.

REFERENCES CITED

The following references are of record in the file of this patent:

UNITED STATES PATENTS

| Number | Name | Date |
|---|---|---|
| 327,008 | Miller | Sept. 29, 1885 |
| 1,194,005 | From | Aug. 8, 1916 |
| 1,508,705 | Mahan | Sept. 16, 1924 |

FOREIGN PATENTS

| Number | Country | Date |
|---|---|---|
| 19,979 | Germany | Apr. 16, 1882 |